United States Patent
Claudy

(10) Patent No.: US 11,781,311 B2
(45) Date of Patent: Oct. 10, 2023

(54) TILE SETTING STRUCTURE AND METHOD OF SETTING TILE

(71) Applicant: Christopher J. Claudy, Kennett Square, PA (US)

(72) Inventor: Christopher J. Claudy, Kennett Square, PA (US)

(*) Notice: Subject to any disclaimer, the term of this patent is extended or adjusted under 35 U.S.C. 154(b) by 0 days.

(21) Appl. No.: 17/495,046

(22) Filed: Oct. 6, 2021

(65) Prior Publication Data

US 2022/0025641 A1 Jan. 27, 2022

Related U.S. Application Data

(63) Continuation of application No. 16/408,843, filed on May 10, 2019, now Pat. No. 11,155,992.

(60) Provisional application No. 62/670,292, filed on May 11, 2018.

(51) Int. Cl.
| | |
|---|---|
| *E04B 1/348* | (2006.01) |
| *E04C 2/20* | (2006.01) |
| *E04F 13/08* | (2006.01) |
| *B32B 13/04* | (2006.01) |
| *B32B 13/12* | (2006.01) |
| *B32B 3/12* | (2006.01) |

(52) U.S. Cl.
CPC ............ *E04B 1/34846* (2013.01); *B32B 3/12* (2013.01); *B32B 13/045* (2013.01); *B32B 13/12* (2013.01); *E04C 2/205* (2013.01); *E04F 13/0885* (2013.01); *B32B 2307/7265* (2013.01); *B32B 2419/04* (2013.01)

(58) Field of Classification Search
CPC .......... A47K 3/284; A47K 3/283; A47K 3/40; A47K 3/28; A47K 3/00; E04F 15/02188
See application file for complete search history.

(56) References Cited

U.S. PATENT DOCUMENTS

| | | | |
|---|---|---|---|
| 3,992,825 A | 11/1976 | May | |
| 4,993,201 A | 2/1991 | Bunyard | |
| 5,311,707 A | 5/1994 | Laroche et al. | |
| 5,816,005 A * | 10/1998 | Han ...................... | A47K 3/008 52/390 |
| 5,913,777 A | 6/1999 | Gerber | |
| 6,003,169 A | 12/1999 | Davis, Jr. | |
| 6,643,863 B1 | 11/2003 | Gerber | |
| 8,511,016 B2 * | 8/2013 | Smythe, Jr. ............ | E04F 13/06 52/287.1 |

(Continued)

FOREIGN PATENT DOCUMENTS

EP 3009576 A1 4/2016

OTHER PUBLICATIONS

DUROplastic polypropylene honeycomb, http://www.duroplastic.com/polypropylene-honeycomb.html, dated Jun. 21, 2017, 3 pages.

*Primary Examiner* — Gisele D Ford
(74) *Attorney, Agent, or Firm* — Barley Snyder

(57) ABSTRACT

A method of setting tile includes constructing a floor panel and a plurality of wall panels and attaching each of the plurality of wall panels to either the floor panel or one of the other wall panels with a waterproof caulk. Each of the wall panels includes a first rigid layer, a second rigid layer attached to the first rigid layer by a thinset mortar, and a waterproofing layer formed of a flexible material and attached to the second rigid layer by the thinset mortar.

20 Claims, 8 Drawing Sheets

(56) References Cited

U.S. PATENT DOCUMENTS

| | | |
|---|---|---|
| 8,789,316 B2 | 7/2014 | Cook |
| 9,297,167 B1 | 3/2016 | Stockton |
| 9,848,741 B2 | 12/2017 | Slothower et al. |
| 9,883,777 B2 | 2/2018 | Smith et al. |
| 10,017,320 B2 | 7/2018 | Wallis |
| 2009/0100769 A1 | 4/2009 | Barrett et al. |
| 2013/0097944 A1 | 4/2013 | Van Ravenhorst |
| 2013/0264240 A1 | 10/2013 | Wallis |
| 2015/0107018 A1 | 4/2015 | Vagedes |
| 2016/0160496 A1 | 6/2016 | Bernd et al. |
| 2017/0071415 A1 | 3/2017 | Rosko et al. |
| 2017/0071416 A1 | 3/2017 | Bernd et al. |
| 2017/0241124 A1 | 8/2017 | Erlebach |
| 2018/0209144 A1 | 7/2018 | Hedgcock |
| 2018/0266095 A1 | 9/2018 | Cobb et al. |

\* cited by examiner

ást
TILE SETTING STRUCTURE AND METHOD OF SETTING TILE

CROSS-REFERENCE TO RELATED APPLICATIONS

This application is a continuation of U.S. patent application Ser. No. 16/408,843, filed May 10, 2019, which claims priority under 35 U.S.C. § 119 to U.S. Provisional Patent Application No. 62/670,292, filed May 11, 2018.

FIELD OF THE INVENTION

The present invention relates to a tile setting structure and, more particularly, to a tile setting structure to which a tile is capable of being attached and a method of setting tile using the tile setting structure.

BACKGROUND

Tile in a residential or commercial structure, such as on the floor and walls of a bathroom, has a number of different known application methods to achieve a durable, watertight tiled structure. In various application methods, multiple layers including a cement backing board, a vapor barrier, and/or a waterproofing membrane are successively attached both to studs defining the walls and a substrate of the floor for waterproofing and structural support. In another application method, a composite board is attached directly to the studs or substrate and serves as both a waterproofing layer and a structural support layer. Tile is then attached to the cement backing board, the waterproofing membrane, or the composite board using a thinset mortar.

These known application methods are performed on-site. Cutting each applied layer to the proper size, sealing seams of the layers, and applying multiple layers takes significant time and produces a substantial amount of waste from cut material. Further, by attaching each layer to the studs and substrate, dimensional errors in the studs or the substrate are carried through to the surface on which the tile is applied. The application of tile to non-plumb, curved, or otherwise dimensionally imprecise surfaces is difficult and often results in a finished product that is not aesthetically pleasing.

Tiled structures including, for example, the finished walls and floor of a bathroom, are sometimes prefabricated off-site to address some of the aforementioned issues. The prefabricated tiled structure or pod includes everything from the inner tile layer to an exterior supportive steel framing. Although on-site installation is made more efficient, these pods require both costly raw materials and excessive shipping costs due to the size and weight of the finished pod.

SUMMARY

A method of setting tile includes constructing a floor panel and a plurality of wall panels and attaching each of the plurality of wall panels to either the floor panel or one of the other wall panels with a waterproof caulk. Each of the wall panels includes a first rigid layer, a second rigid layer attached to the first rigid layer by a thinset mortar, and a waterproofing layer formed of a flexible material and attached to the second rigid layer by the thinset mortar.

BRIEF DESCRIPTION OF THE DRAWINGS

The invention will now be described by way of example with reference to the accompanying figures, of which.

DETAILED DESCRIPTION OF THE EMBODIMENTS

Figure 1:
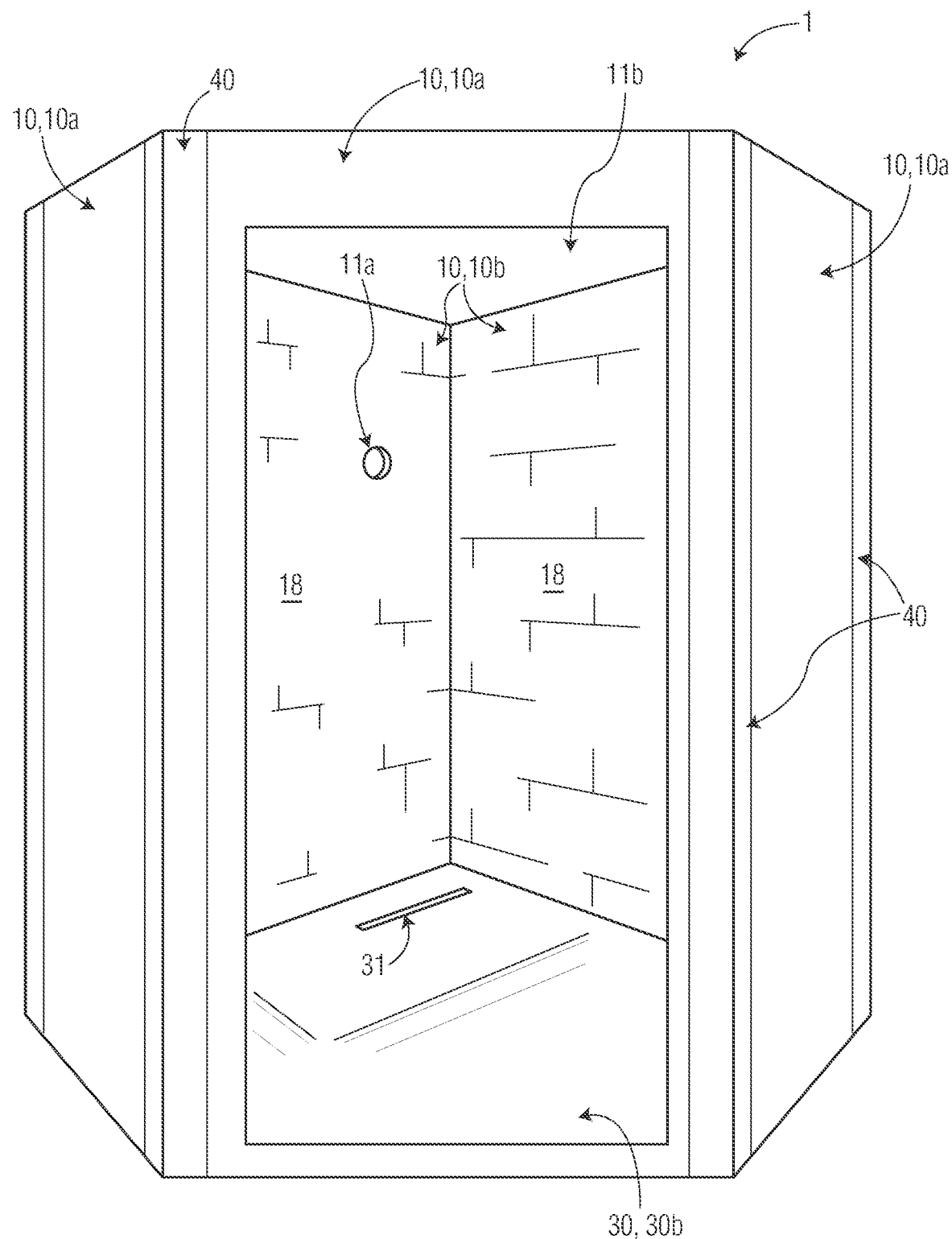
FIG. 1 is a front perspective view of a tile setting structure according to an embodiment.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein; rather, these embodiments are provided so that the present disclosure will convey the concept of the disclosure to those skilled in the art.

Figure 2:
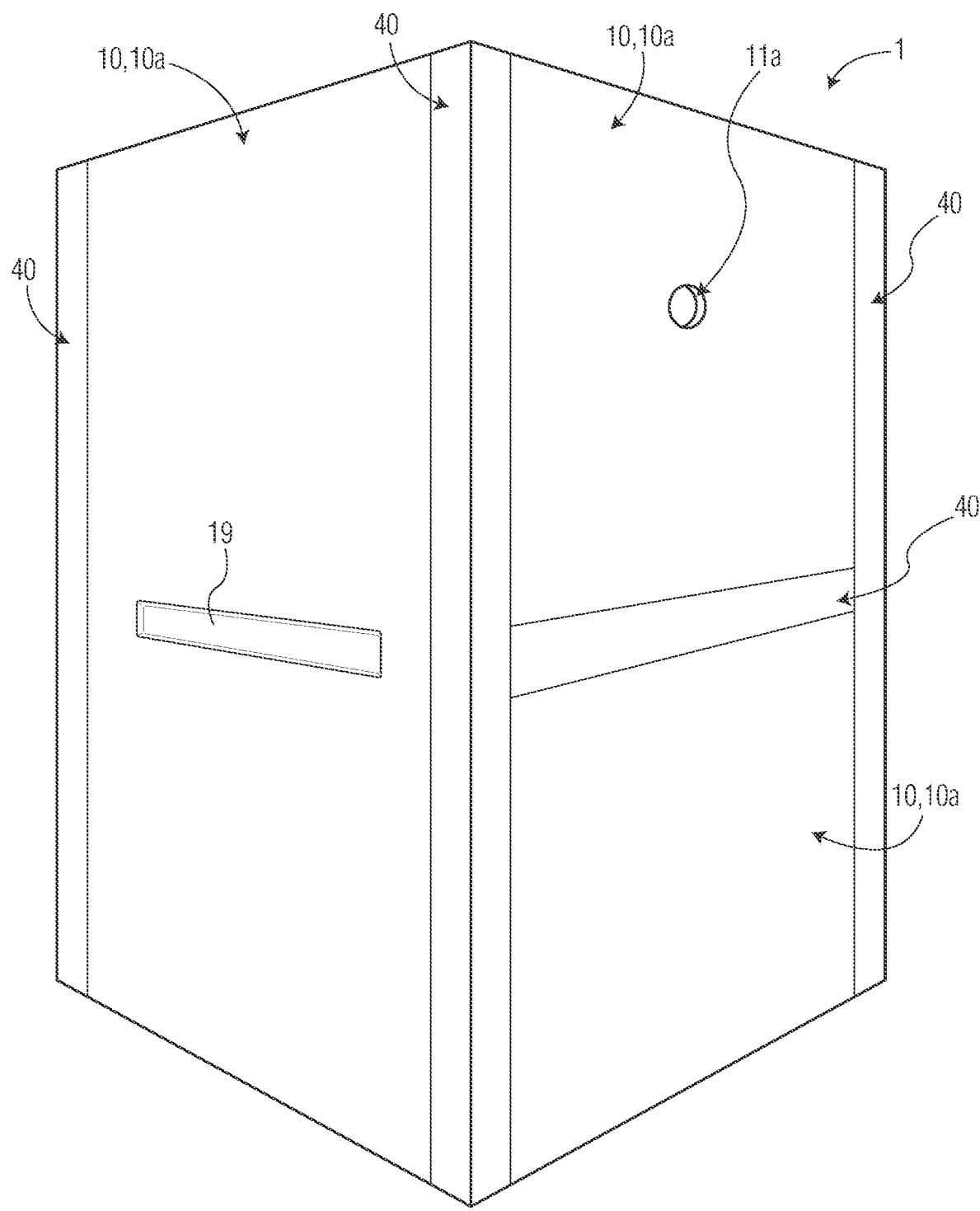
FIG. 2 is a rear perspective view of the tile setting structure.

A tile setting structure 1 according to an embodiment is shown in FIGS. 1 and 2. The tile setting structure 1 includes a plurality of wall panels 10, a floor panel 30, and a plurality of seam systems 40.

Figure 3:
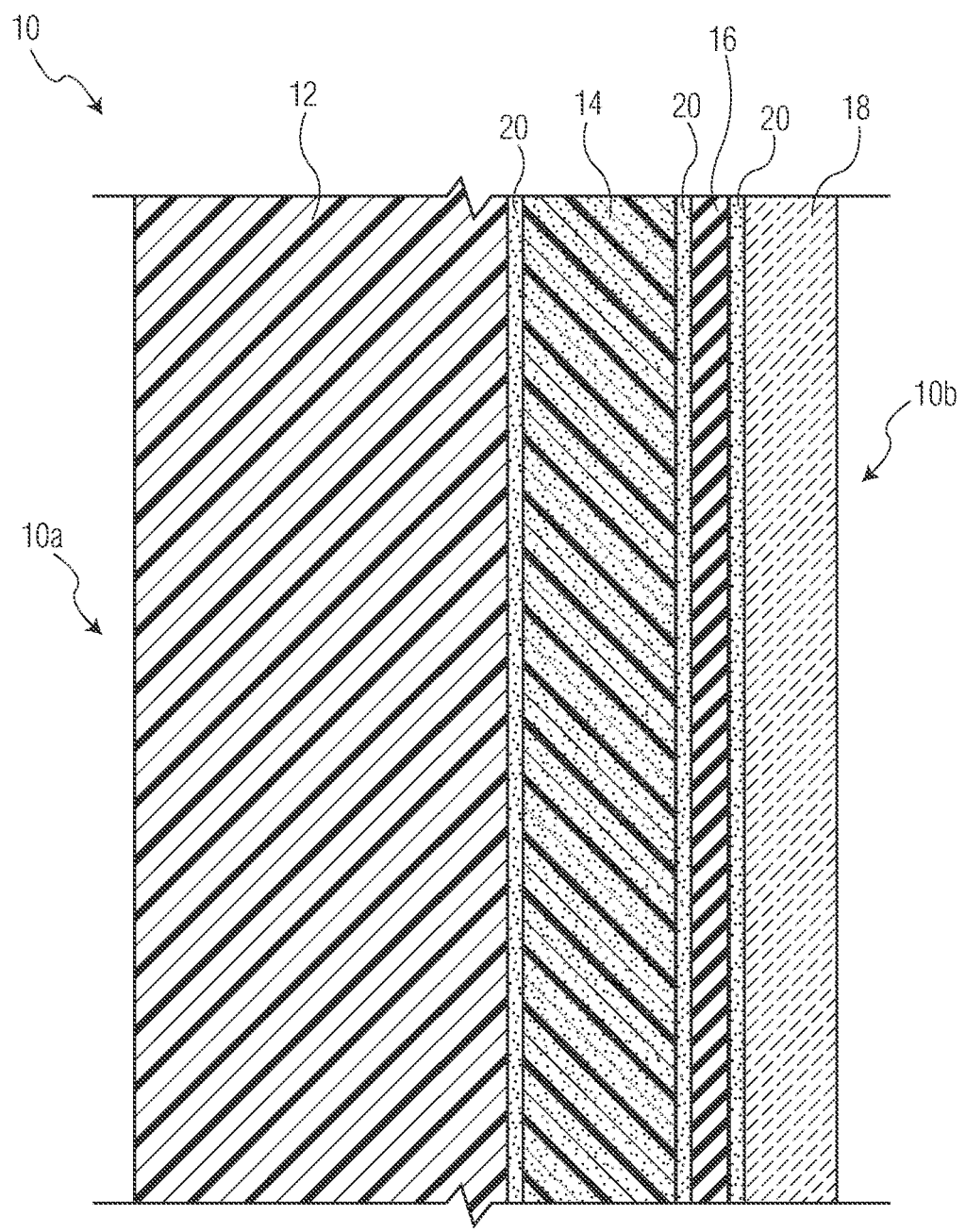
FIG. 3 is a sectional view of a wall panel of the tile setting structure.

The wall panels 10, as shown in FIGS. 1-3, are each comprised of a plurality of layers between an exterior side 10a and a tile side 10b opposite the exterior side 10a. Each of the wall panels 10, starting from the exterior side 10a, includes a first rigid layer 12, a second rigid layer 14, a waterproofing layer 16, and a tile layer 18. As will be described in greater detail below, a layer of thinset mortar 20 attaches each of the layers 12, 14, 16, and 18 together. In an embodiment, the tile layer 18 and corresponding layer of thinset mortar 20 can be omitted and the wall panel 10 includes the first rigid layer 12, the second rigid layer 14, and the waterproofing layer 16, with the layer of thinset mortar 20 attaching each of the layers 12, 14, and 16 together.

Sectional views of the wall panels 10 and floor panel 30 are shown in FIGS. 3 and 5-7. A relative thickness of the layers in each of the wall panels 10 and floor panel 30 as shown in FIGS. 3-6 is merely illustrative and is not meant to be representative of a particular thickness of any of the layers. A particular thickness of any of the layers should be interpreted as described herein in the description and not as shown in the Figures.

The first rigid layer 12, shown in FIG. 3, has a first side facing the exterior side 10a of the wall panel 10. The first rigid layer 12 is formed of a rigid, lightweight thermoplastic material. In an embodiment, the material of the first rigid layer 12 has a density less than or equal to 20 lb/ft$^3$, a tensile strength of at least 120 psi, a compressive strength of at least 140 psi, and a shear strength of at least 55 psi. In an embodiment, the first rigid layer 12 is formed of a polypropylene honeycomb material, and in an exemplary embodiment, is PLASCORE PP Polypropylene Honeycomb.

A first side of the second rigid layer 14, as shown in FIG. 3, is attached to a second side of the first rigid layer 12 opposite the first side of the first rigid layer 12. The second rigid layer 14 is formed at least in part of a rigid, lightweight thermoplastic material. In an embodiment, the second rigid layer 14 is formed a polystyrene foam. In another embodiment, the polystyrene foam of the second rigid layer 14 is reinforced with a glass fiber and coated with a cement on both sides and is capable of acting as a waterproof barrier, and in an exemplary embodiment, is a WEDI building board. In an embodiment, the material of the second rigid layer 14 has a density less than or equal to 20 lb/ft$^3$, a tensile strength of at least 60 psi, a compressive strength of at least 30 psi, and a shear strength of at least 25 psi. In another embodiment, the second rigid layer 14 is formed of a same material as the first rigid layer 12.

The first side of the second rigid layer 14 is attached to the second side of the first rigid layer 12 by a thinset mortar 20 as shown in FIG. 3. The thinset mortar 20 may be any type of thinset mortar used by those with ordinary skill in the art in construction applications. In an embodiment, the thinset mortar 20 is a MEGALITE RS mortar. The thinset mortar 20 is applied to the second side of the first rigid layer 14 and the second rigid layer 14 is attached thereto according to methods of thinset application known and widely used in the art.

A first side of the waterproofing layer 16, as shown in FIG. 3, is attached to a second side of the second rigid layer 14 opposite the first side of the second rigid layer 14 by the thinset mortar 20. In various embodiments, the waterproofing layer 16 is formed of a non-plasticized elastomer or a polyethylene. In an embodiment, the waterproofing layer 16 is formed from an alloy of chlorinated polyethylene (CPE) and has a polyester fabric laminated to both sides, and in an exemplary embodiment, is DALTILE Dal-Seal TS. In another exemplary embodiment, the waterproofing layer 16 is SCHLUTER-KERDI waterproof membrane. In other embodiments, the waterproofing layer 16 may be formed of any flexible, sheet-like material capable of being used as a waterproof barrier in construction applications and adherable to the thinset mortar 20.

Figure 4:
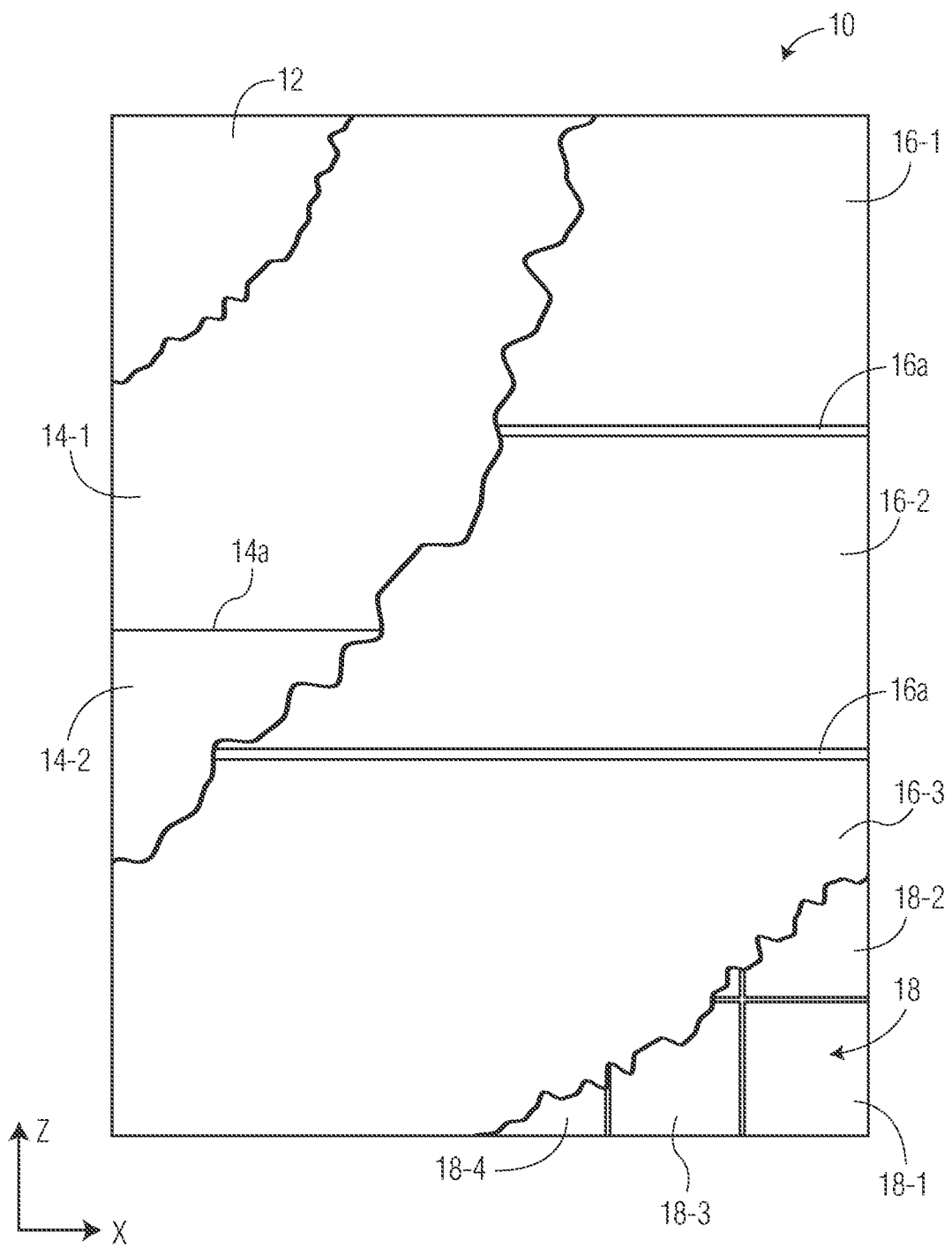
FIG. 4 is a sectional plan view of the wall panel.

For each wall panel 10, a size of a continuous piece of the first rigid layer 12 dictates an overall height in a height direction Z and width in a width direction X of the wall panel 10 shown in FIG. 4. If a height or width of a continuous piece 14-1, 14-2 of the second rigid layer 14 is less than a height or width of the first rigid layer 12, seams 14a are produced on the wall panel 10 where the pieces 14-1, 14-2 of second rigid layer 14 abut one another. Pieces 16-1, 16-2, 16-3 of the waterproofing layer 16 are applied on the second rigid layer 14 such that any seams 14a in the second rigid layer 14 are at least predominantly overlapped by a continuous piece 16-1, 16-2, 16-3 of the waterproofing layer 16; pieces 16-1, 16-2, 16-3 of the waterproofing layer 16 are arranged such that any seams in the waterproofing layer 16 do not completely align with any seams 14a in the second rigid layer 14. Further, pieces 16-1, 16-2, 16-3 of the waterproofing layer 16 are arranged to have an area of overlap 16a at the seams of the pieces 16-1, 16-2, 16-3 in order to form a continuous waterproof barrier. In FIG. 4, the relative sizes of the pieces of the layers 14 and 16, the number of the seams, and the locations of the seams are merely illustrative.

A first side of the tile layer 18, as shown in FIG. 3, is attached to a second side of the waterproofing layer 16 opposite the first side of the waterproofing layer 16 by the thinset mortar 20. The tile layer 18 includes a plurality of tiles 18-1 to 18-n, as shown in FIG. 4, each attached by the thinset mortar 20 to the waterproofing layer 16. As is known in the art, the tiles 18-1 to 18-n within the tile layer 18 may have grout disposed between them. The tiles 18-1 to 18-n may be any type of tile known to those with ordinary skill in the art including any shape, pattern, color, or texture known in the art. The tiles 18-1 to 18-n may also be a ceramic tile, a porcelain tile, a decorative glass tile, an aluminum tile, or any other tile material known to those with ordinary skill in the art. The tiles 18-1 to 18-n may also vary within one tile layer 18. In an embodiment, the tile layer 18 is omitted from the wall panel 10 and the wall panel 10 only includes the layers 12, 14, and 16 attached by the thinset mortar 20. In an embodiment, a thickness of the wall panel 10 between the exterior side 10a and the tile side 10b is approximately 1.25".

Figure 5:
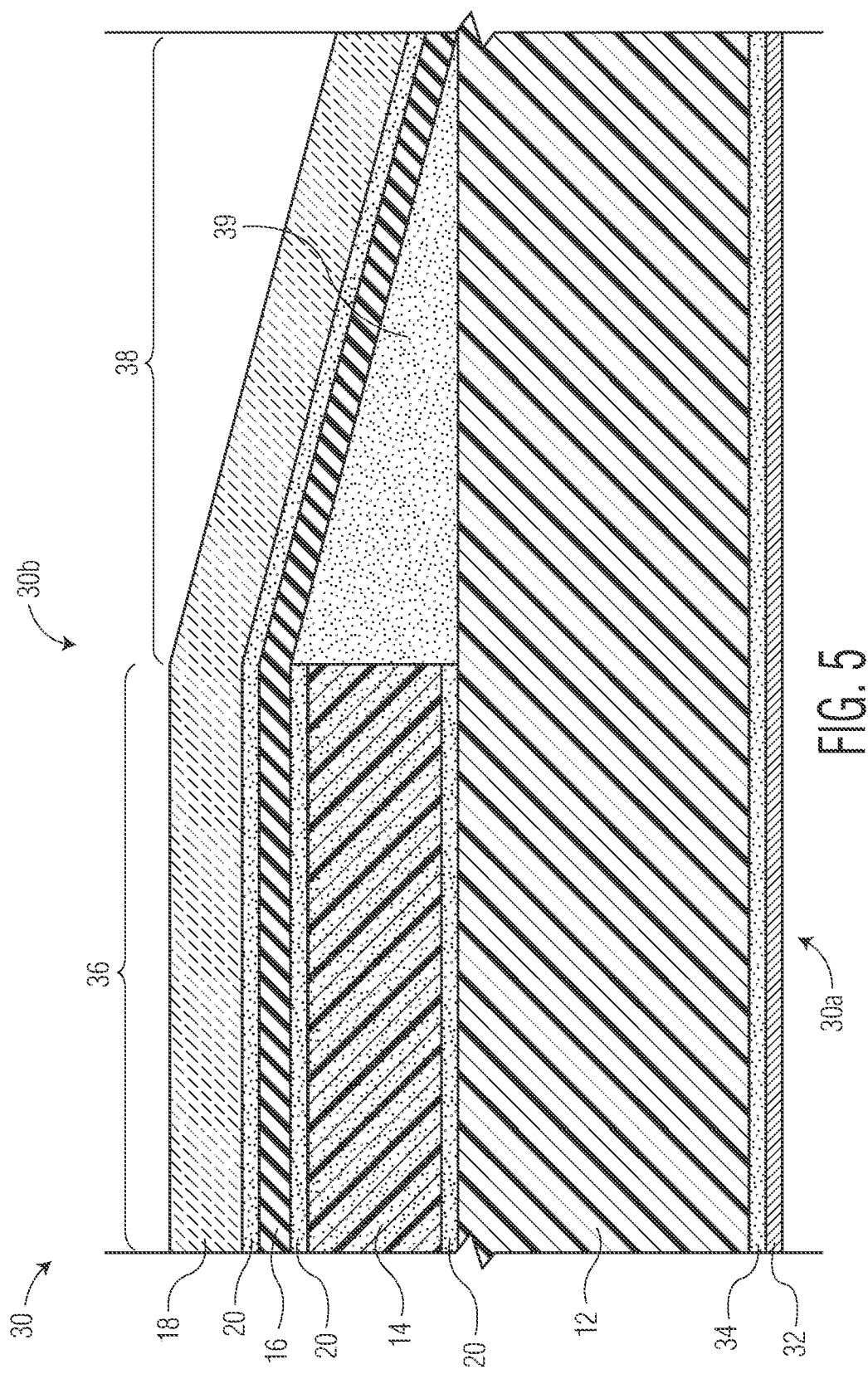
FIG. 5 is a sectional view of a floor panel of the tile setting structure.

The floor panel 30, as shown in FIGS. 1 and 5, is comprised of a plurality of layers between an exterior side 30a and a tile side 30b opposite the exterior side 30a. Some of the layers of the floor panel 30 are the same as layers of the wall panel 10 and, for these layers, like reference numbers indicate like elements.

The floor panel 30 includes a reinforcing layer 32 having a first side facing the exterior side 30a of the floor panel 30 as shown in FIG. 5. The reinforcing layer 32 is formed of a thin, stiff material. In an embodiment, the reinforcing layer 32 is formed of a sheet of metal, and in an exemplary embodiment, is formed of a sheet of galvanized steel or tin.

A first side of the first rigid layer 12 of the floor panel 30, as shown in FIG. 5, is attached to a second side of the reinforcing layer 32 opposite the first side of the reinforcing layer 32 by an adhesive layer 34. The adhesive layer 34 is a multi-surface adhesive and, in an embodiment, is a water-based multi-surface bonding primer (MBP).

As shown in the embodiment of FIG. 5, the floor panel 30 has a flat section 36 and a sloped section 38. In various applications of the tile setting structure 1, the floor panel 30 may need to be completely flat, completely sloped, or include both flat and sloped portions. In various embodiments, the floor panel 30 may therefore be entirely comprised of the flat section 36, entirely comprised of the sloped section 38, or, as shown in FIG. 5, include both flat sections 36 and sloped sections 38. The slope of the slope section 38 shown in FIG. 5 is merely exemplary.

Figure 6:
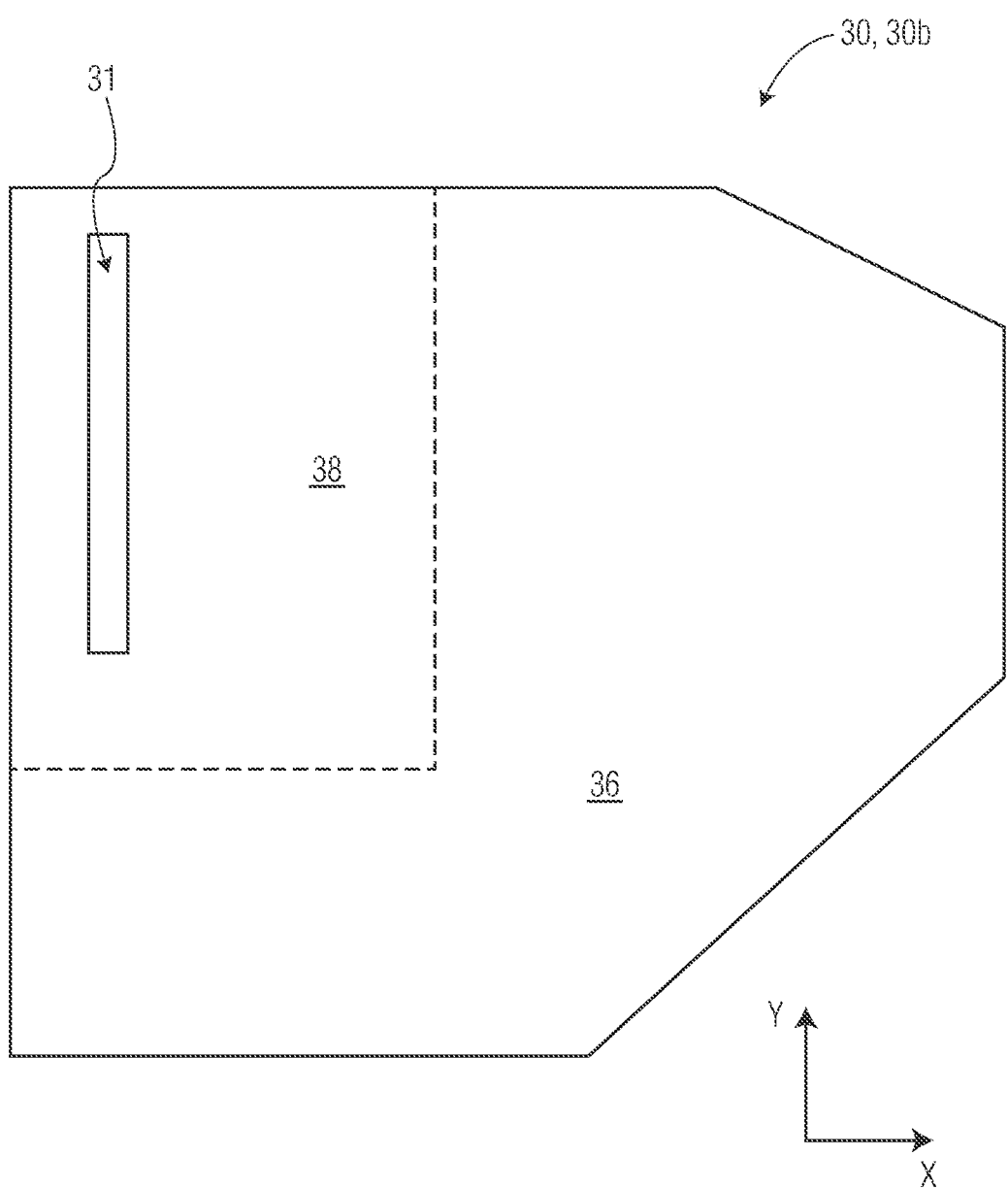
FIG. 6 is a plan view of the floor panel.

An exemplary arrangement of the flat section 36 and sloped section 38 is shown in FIGS. 1 and 6. In the embodiment shown in FIG. 6, a majority of the floor panel 30 is the flat section 36; the sloped section 38 is sloped from the flat section 36 and ends in a drain passageway 31 extending through all the layers of the floor panel 30. As would be understood by one with ordinary skill in the art, the flat sections 36 and sloped sections 38 may be arranged differently in a wide variety of tiled floor applications. For example, in bathroom applications, one with ordinary skill in the art would understand that the location of a drain, size of the floor, and shape of the floor will dictate the required flat sections 36 and sloped sections 38 of the floor panel 30.

In the flat section 36, as shown in FIG. 5, a first side of the second rigid layer 14 is attached to a second side of the first rigid layer 12 opposite the first side of the first rigid layer 12 by the thinset mortar 20. A first side of the waterproofing layer 16 is attached to a second side of the second rigid layer 14 opposite the first side of the second rigid layer 14 by the thinset mortar 20. The orientation of the pieces of the second rigid layer 14 and the pieces of the waterproofing layer 16 in the flat section 36 is the same as that described with respect to FIG. 4 above. A first side of the tile layer 18 is attached to a second side of the waterproofing layer 16 opposite the first side of the waterproofing layer 16 by the thinset mortar 20.

In the sloped section 38, as shown in FIG. 5, a sloping mortar 39 is applied to a second side of the first rigid layer 12 opposite the first side of the first rigid layer 12. The sloping mortar 39 may be any type of fast-drying, cement-based mortar known in the art and capable of being applied in a sloping orientation. As described above, the sloping mortar 39 may be set to have any slope or shape desired for the application. The first side of the waterproofing layer 16, which may be continuous with the waterproofing layer 16 in the flat section 36, is applied to the sloping mortar 39 on a side opposite the first rigid layer 12 and is attached by the adhesive properties of the sloping mortar 39. A first side of the tile layer 18 is attached to a second side of the waterproofing layer 16 opposite the first side of the waterproofing layer 16 by the thinset mortar 20.

Like the wall panel 10 described above, in an embodiment, the tile layer 18 is omitted from the floor panel 30 and the floor panel 30 only includes the layers 32, 12, 14, and 16 in the flat section 36 and the layers 32, 12, 39, and 16 in the sloped section 38. In an embodiment, an overall thickness of the flat section 36 between the exterior side 30a and the tile side 30b is approximately 1.6" and a minimum overall thickness of the sloped section 38 between the exterior side 30a and the tile side 30b is approximately 1.25".

The assembly of the tile setting structure 1 will now be described in greater detail with reference to FIGS. 1, 2, 7, and 8.

Figure 7:
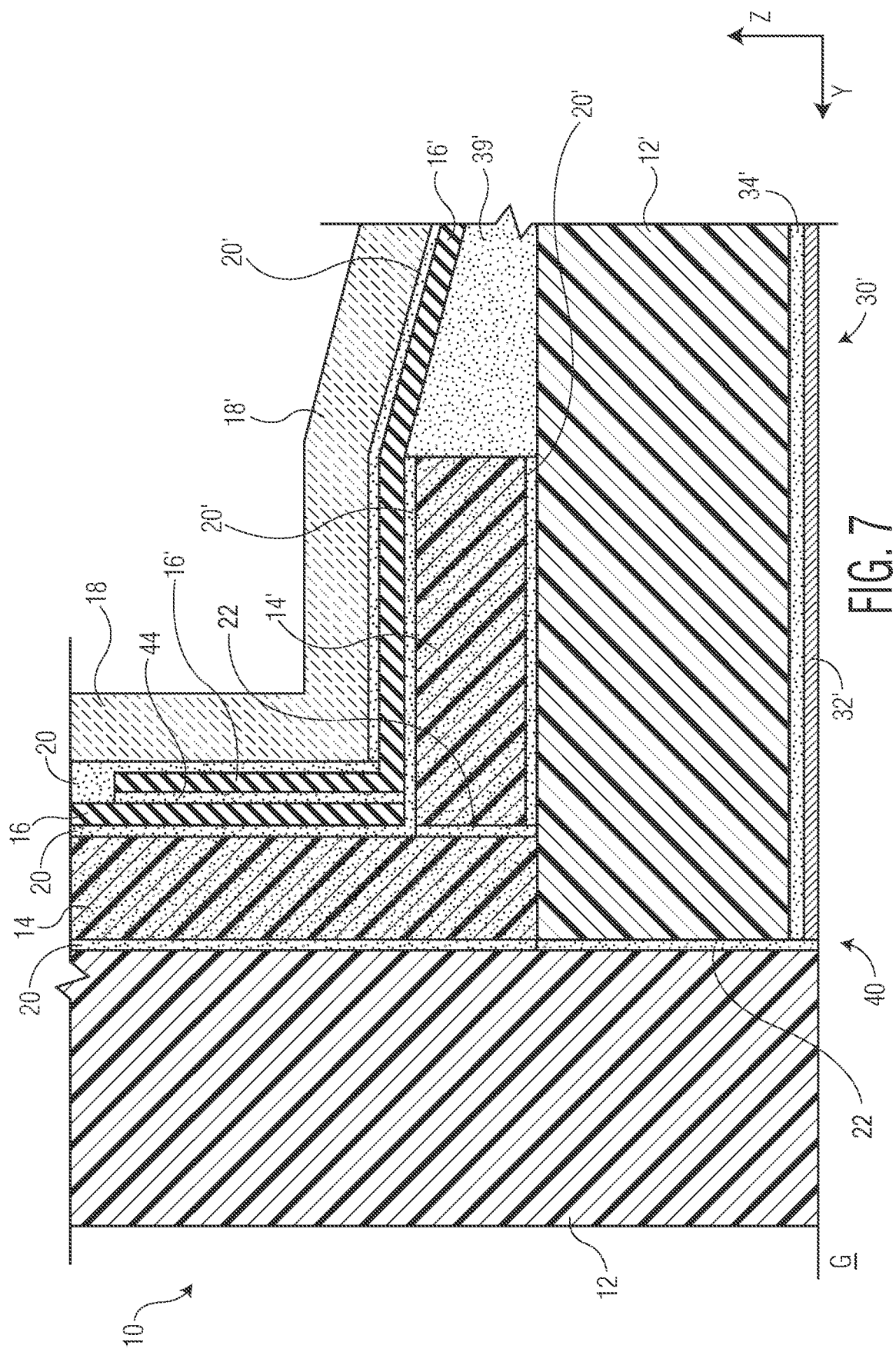
FIG. 7 is a sectional view of an end of the wall panel and an end of the floor panel.

As shown in FIGS. 1 and 2, depending on the application, all or at least some of the wall panels 10 are attached to the floor panel 30 to form the tile setting structure 1; each of the wall panels 10 extends in a direction perpendicular to a direction of the floor panel 30. The attachment of one of the wall panels 10 to the floor panel 30 is shown in FIG. 7 and applies similarly to the attachment of any wall panel 10 to the floor panel 30. In FIG. 7, all elements of the floor panel 30 are labeled as, for example, 30' to avoid confusion with elements of the wall panel 10 attached to the floor panel 30'. As is clear from FIG. 7, though, all elements of the floor panel 30' are intended to be the same as the elements of floor panel 30 described above.

As shown in FIG. 7, an end of the wall panel 10 and an end of the floor panel 30' that are attached to one another are cut in a stepped manner to facilitate the attachment. An end of the first rigid layer 12 of the wall panel 10 is positioned to abut a ground surface G and an end of the first rigid layer 12' of the floor panel 30'. The second rigid layer 14 is cut from the end of the wall panel 10 in the height direction Z by a height of the reinforcing layer 32', the adhesive layer 24', and the first rigid layer 12' in the height direction Z. The second rigid layer 14' is cut from an end of the floor panel 30' in a length direction Y by a length of the second rigid layer 14 of the wall panel 10 in the length direction Y. The waterproofing layer 16 is cut from the end of the wall panel 10 in the height direction Z by a height of the reinforcing layer 32', the adhesive layer 24', the first rigid layer 12', and the second rigid layer 14' in the height direction Z.

The ends of the wall panel 10 and the floor panel 30' are positioned in abutment with one another such that the first rigid layers 12, 12' abut one another, the second rigid layers 14, 14' abut one another, and the waterproofing layer 16' of the floor panel 30' overlaps the waterproofing layer 16 of the wall panel 10, as shown in FIG. 7. One of the seam systems 40 is used to attach the ends of the wall panel 10 and the floor panel 30' together.

Figure 8:
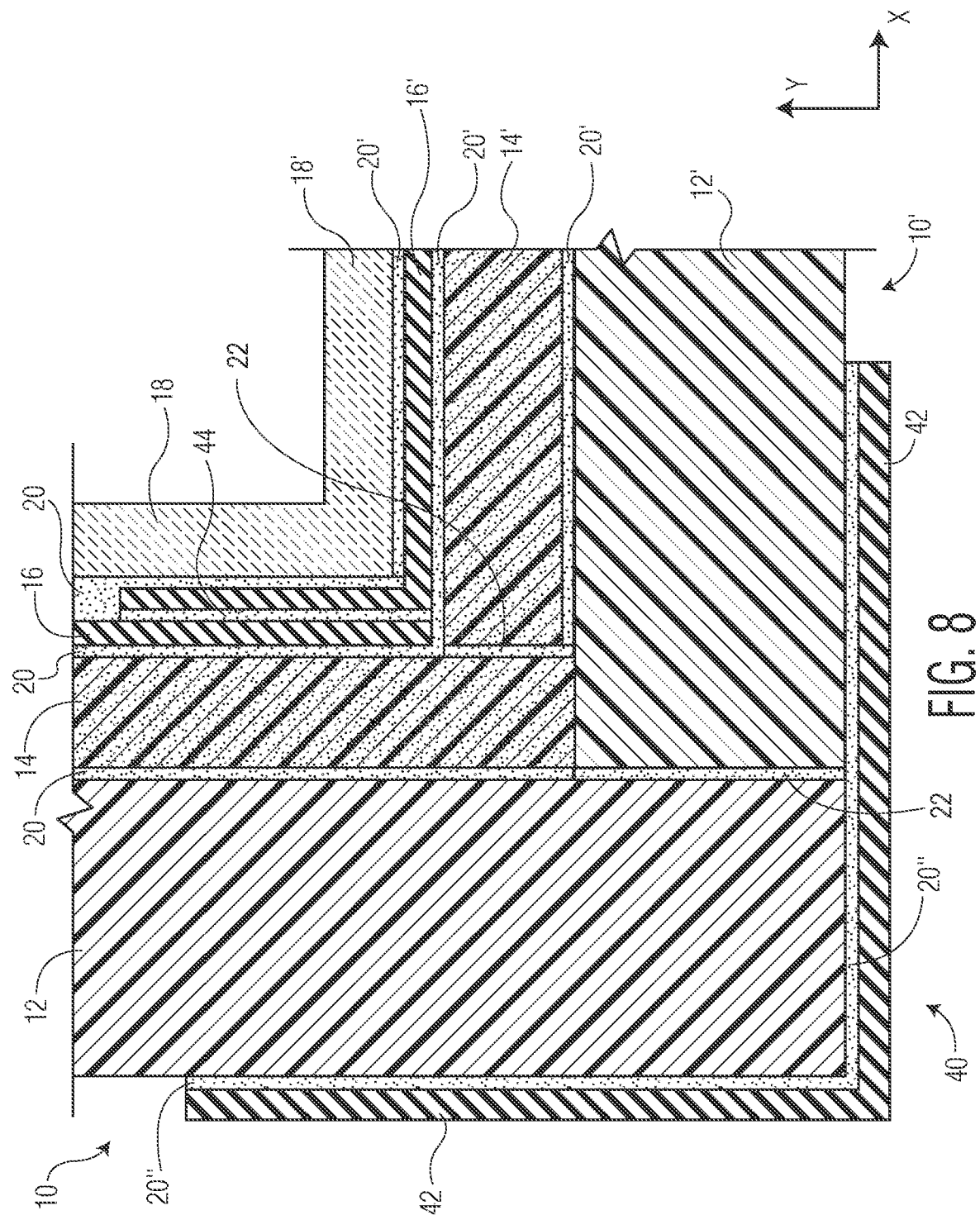
FIG. 8 is a sectional view of an end of a first wall panel and an end of a second wall panel.

The seam system 40, as shown in FIGS. 7 and 8, includes a thinset mortar 20", a waterproof caulk 22, and a bonding agent 44. The waterproof caulk 22 is applied between the abutting ends of the first rigid layers 12, 12' and the abutting ends of the second rigid layers 14, 14'. The waterproof caulk 22 provides an initial adhesive attaching the wall panel 10 to the floor panel 30'. The bonding agent 44 is applied to adhere the overlapped waterproofing layers 16, 16' to one another. The bonding agent 44 may be any type of adhesive capable of adhering the waterproofing layers 16, 16' to one another. In an embodiment, the bonding agent 44 is NOBLEBOND EXT. The tile layers 18, 18' may be attached to the waterproofing layers 16, 16' prior to or after the attachment of the wall panel 10 to the floor panel 30'.

The wall panels 10 are attached to one another as shown in FIG. 8. In FIG. 8, all elements of one of the wall panels 10 are labeled as, for example, 10' to avoid confusion with elements of the other wall panel 10 attached to the wall panel 10'. As is clear from FIG. 8, though, all elements of the wall panel 10' are the same as elements of the wall panel 10. The thinset mortar 20" is the same as the thinset mortar 20 described above and is labeled thinset mortar 20" in FIG. 8 only to indicate where the thinset mortar 20" is applied during attachment of the already constructed wall panels 10.

As shown in FIG. 8, an end of the wall panel 10 and an end of the wall panel 10' that are attached to one another are cut in a stepped manner to facilitate the attachment. An end of the first rigid layer 12 of the wall panel 10 is positioned to abut an end of the first rigid layer 12' of the wall panel 10'. The second rigid layer 14 is cut from the end of the wall panel 10 in the length direction Y by a length of the first rigid layer 12' in the length direction Y. The second rigid layer 14' is cut from an end of the wall panel 10' in the width direction X by a width of the second rigid layer 14 of the wall panel 10 in the width direction X. The waterproofing layer 16 is cut from the end of the wall panel 10 in the length direction Y by a length of the first rigid layer 12' and the second rigid layer 14' in the length direction Y.

The ends of the wall panel 10 and the wall panel 10' are positioned in abutment with one another such that the first rigid layers 12, 12' abut one another, the second rigid layers 14, 14' abut one another, and the waterproofing layer 16' of the wall panel 10' overlaps the waterproofing layer 16 of the wall panel 10, as shown in FIG. 8. One of the seam systems 40 is used to attach the ends of the wall panel 10 and the wall panel 10' together. The waterproof caulk 22 is applied between the abutting ends of the first rigid layers 12, 12' and the abutting ends of the second rigid layers 14, 14' to provide an initial attachment of the wall panels 10, 10' to each other. The bonding agent 44 is applied to adhere the overlapped waterproofing layers 16, 16' to one another. The tile layers 18, 18' may be attached to the waterproofing layers 16, 16' prior to or after the attachment of the wall panel 10 to the wall panel 10'.

For the attachment of the wall panels 10, 10', the seam system 40 includes an outer seam layer 42. The outer seam layer 42, as shown in FIG. 8, covers a seam between the wall panels 10, 10' and is attached by the thinset mortar 20" to both the exterior side 10a of the wall panel 10 and the exterior side 10a' of the wall panel 10'. In an embodiment, the outer seam layer 42 is formed of a same material as the waterproofing layer 16 described above. In other embodiments, the outer seam layer 42 may be formed of any flexible, sheet-like material capable of being used as a waterproof barrier.

In the embodiment shown in FIG. 8, the wall panels 10, 10' are attached at a 90° angle. In other embodiments, and as shown in FIGS. 1 and 2, the walls panels 10, 10' may be similarly attached with the seam system 40 at any angle by adjusting an angle of the cuts described above, or the wall panels 10, 10' may be attached with the seam system 40 end-to-end and extending in a same direction without requiring any of the cuts described above.

A method of setting tile using the tile setting structure 1 will now be described in greater detail with reference to FIGS. 1 and 2.

The tile setting structure 1, when fully constructed as shown in FIGS. 1 and 2, forms the tiled walls and tiled floor of a tiled room. In the shown embodiment, the tile setting structure 1 forms the tiled walls and tiled floor of a bathroom. The tiled room formed by the tile setting structure 1 is a tiled room of a residential or commercial structure. In the following description, the residential or commercial structure in which the tile setting structure 1 is installed is referred to as "on-site" and a location remote from the residential or commercial structure, such that it would require shipping or other movement of the tile setting structure 1 to arrive on-site, is referred to as "off-site."

The plurality of wall panels 10 and the floor panel 30 are constructed off-site. Outer dimensions of the wall panels 10 and floor panel 30 are cut off-site according to specific dimensions of the tiled room provided for the on-site installation. Passageways and recesses specific for the on-site installation are also cut off-site in the wall panels 10 and floor panel 30. As shown in FIGS. 1 and 6, for example, the floor panel 30 may be cut off-site to the specified outer dimensions with a specified sloped section 38 leading to a cut drain passageway 31 having a specified location. Likewise for the wall panels 10, as shown in the exemplary embodiment of FIGS. 1 and 2, a fixture passageway 11*a* extending through all the layers of one of the wall panels 10 may be cut off-site. In various embodiments, the fixture passageway 11*a* may be used to accommodate plumbing, electrical outlets, or any other device commonly installed in a wall of a tiled room. A frame passageway 11*b* extending through all the layers of one of the wall panels 10, and sized to accommodate ingress and egress, may also be cut off-site. A support recess 19 may also be cut out from the first rigid layer 12 of any of the wall panels 10 as shown in FIG. 2; in an embodiment, the support recess 19 receives a plate or other support member to which a fixture on the tile side 10*b*, such as a towel bar, can be screwed to the wall panel 10.

After construction and cutting of the wall panels 10 and floor panel 30, the wall panels 10 and floor panels 30 are shipped from the off-site location to the on-site location. In an embodiment, the separate wall panels 10 and floor panels 30 are stacked on top of one another and shipped flat. In this embodiment, the assembly described above and shown in FIGS. 7 and 8 occurs on-site and at least corner sections of the tile layers 18 are attached on-site after the tile setting structure 1 is assembled. In another embodiment, the tile setting structure 1 is entirely pre-fabricated off-site, either including the tile layers 18 or not including the tile layers 18, and shipped in the assembled state shown in FIGS. 1 and 2 to the on-site location.

When fully assembled and installed on-site, the tile setting structure 1 is sufficiently rigid to be free-standing and does not require attachment to existing studs on-site. The tile setting structure 1 has a significantly lower weight than existing pre-fabricated tiled structures and is less expensive to ship; shipping costs are further reduced by the capability of shipping the tile setting structure 1 flat prior to assembly. By fabricating the wall panels 10 and floor panel 30 to a particular specification off-site, waste during production is reduced, saving additional costs, and the pre-cut fixture passageways 11*a* limit on-site errors by directing installation performed by other tradespeople. Additionally, by not attaching to the studs and by pre-fabricating the tile setting structure 1 in a controlled environment to be flat, any dimensional errors in the studs or the substrate are not carried through to the surface on which the tile is applied.

What is claimed is:

1. A method of setting tile, comprising:
constructing a floor panel and a plurality of wall panels, each of the wall panels including a first rigid layer, a second rigid layer attached to the first rigid layer by a thinset mortar, and a waterproofing layer formed of a flexible material and attached to the second rigid layer by the thinset mortar, each of the first rigid layer and the second rigid layer are formed of a thermoplastic material;
attaching each of the plurality of wall panels to either the floor panel or one of the other wall panels with a waterproof caulk; and
shipping the floor panel and the plurality of wall panels from an off-site location to an on-site location.

2. The method of claim 1, wherein the constructing step occurs at the off-site location.

3. The method of claim 1, wherein the attaching step occurs at the off-site location.

4. The method of claim 1, wherein the attaching step occurs at the on-site location.

5. The method of claim 1, further comprising cutting the floor panel and the plurality of wall panels to a specific dimension of the on-site location at the off-site location.

6. The method of claim 1, wherein the attaching step includes cutting an end of a first wall panel of the wall panels and at least one of an end of a second wall panel of the wall panels or an end of the floor panel in a stepped manner.

7. The method of claim 6, wherein the attaching step includes attaching the end of the first wall panel to the end of the second wall panel and/or the end of the floor panel.

8. The method of claim 1, wherein the first rigid layer is formed of a polypropylene honeycomb material.

9. The method of claim 8, wherein the second rigid layer is formed of a polystyrene foam.

10. The method of claim 1, wherein the floor panel includes a first rigid layer formed of a same material as the first rigid layer of the wall panel and a waterproofing layer formed of a same material as the waterproofing layer of the wall panel.

11. The method of claim 10, wherein the floor panel includes a reinforcing layer, the first rigid layer of the floor panel is attached to the reinforcing layer by an adhesive layer.

12. The method of claim 11, wherein the floor panel has a flat section and a sloped section.

13. The method of claim 1, further comprising attaching an end of a first wall panel of the wall panels to an end of a second wall panel of the wall panels with a seam system.

14. The method of claim 13, wherein the seam system includes the waterproof caulk attaching the first rigid layer of the first wall panel to the first rigid layer of the second wall panel and a bonding agent adhering the waterproofing layer of the first wall panel to the waterproofing layer of the second wall panel.

15. The method of claim 14, wherein the seam system includes an outer seam layer formed of a same material as the waterproofing layer, the outer seam layer is disposed to cover a seam between the first wall panel and the second wall panel and is attached to the first rigid layer of the first wall panel and the first rigid layer of the second wall panel by the thinset mortar.

16. The method of claim 1, wherein the wall panels and the floor panel form a tile setting structure that is sufficiently rigid to be free-standing and does not require attachment to existing studs at the on-site location.

17. A method of setting tile, comprising:
constructing a floor panel and a plurality of wall panels, each of the wall panels including a first rigid layer, a second rigid layer attached to the first rigid layer by a thinset mortar, and a waterproofing layer formed of a flexible material and attached to the second rigid layer by the thinset mortar;
attaching each of the plurality of wall panels to either the floor panel or one of the other wall panels with a waterproof caulk;
tiling the plurality of wall panels and the floor panel with a plurality of tiles each attached to the wall panels and the floor panel by the thinset mortar; and
shipping the floor panel and the plurality of wall panels from an off-site location to an on-site location.

18. The method of claim 17, wherein the tiling step occurs at the off-site location.

19. A method of setting tile, comprising:
constructing a floor panel and a plurality of wall panels, each of the wall panels including a first rigid layer, a second rigid layer attached to the first rigid layer by a thinset mortar, and a waterproofing layer formed of a flexible material and attached to the second rigid layer by the thinset mortar, the floor panel includes a first rigid layer formed of a same material as the first rigid layer of the wall panel and a waterproofing layer formed of a same material as the waterproofing layer of the wall panel, the floor panel includes a reinforcing layer, the first rigid layer of the floor panel is attached to the reinforcing layer by an adhesive layer;
attaching each of the plurality of wall panels to either the floor panel or one of the other wall panels with a waterproof caulk; and
shipping the floor panel and the plurality of wall panels from an off-site location to an on-site location.

20. The method of claim 19, wherein the floor panel has a flat section and a sloped section.

* * * * *